(12) United States Patent
Suzuki et al.

(10) Patent No.: US 12,530,492 B2
(45) Date of Patent: Jan. 20, 2026

(54) SENSORY COMMUNICATION SYSTEM AND SENSORY COMMUNICATION METHOD

(71) Applicant: JVCKENWOOD Corporation, Yokohama (JP)

(72) Inventors: Ako Suzuki, Yokohama (JP); Takayuki Sugahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 50 days.

(21) Appl. No.: 18/746,119

(22) Filed: Jun. 18, 2024

(65) Prior Publication Data

US 2024/0338481 A1  Oct. 10, 2024

Related U.S. Application Data

(63) Continuation of application No. PCT/JP2022/032327, filed on Aug. 29, 2022.

(30) Foreign Application Priority Data

Dec. 23, 2021 (JP) ................. 2021-209849

(51) Int. Cl.
*G06F 21/62* (2013.01)
*G06F 3/01* (2006.01)
*H04L 9/08* (2006.01)

(52) U.S. Cl.
CPC .......... *G06F 21/6245* (2013.01); *G06F 3/015* (2013.01); *H04L 9/0825* (2013.01)

(58) Field of Classification Search
CPC ...... G06F 21/6245; G06F 3/015; G06F 21/62; G06F 21/60; G06F 3/01; H04L 9/0825; A61B 5/055; A61B 5/378; A61B 5/0006; A61B 5/0075; A61B 5/165; A61B 5/4064; A61B 5/7264; A61B 3/10; G16H 10/60; G16H 40/63; G16H 50/20; G16H 50/70

See application file for complete search history.

(56) References Cited

U.S. PATENT DOCUMENTS

2015/0332016 A1   11/2015   Kamitani et al.

FOREIGN PATENT DOCUMENTS

JP  2014-115913    6/2014
WO  WO-2020006271 A1 *  1/2020  ........... A61B 5/7267

OTHER PUBLICATIONS

International Search Report and Written Opinion for International Application Serial No. PCT/JP2022/032327 mailed on Nov. 15, 2022, 8 pages.

* cited by examiner

*Primary Examiner* — Izunna Okeke
(74) *Attorney, Agent, or Firm* — Amin, Turocy & Watson, LLP (57) ABSTRACT

A sensory communication system includes: a first device configured to detect intracerebral activation information of a first subject upon perception by the first subject; an estimation device configured to estimate, based on the detected intracerebral activation information of the first subject, recalled sense information recalled by a second subject different from the first subject for the perception, and perform encryption of the recalled sense information by using the intracerebral activation information of the first subject; and a second device configured to decrypt the encrypted recalled sense information and apply stimulus to the second subject to cause the second subject to recall the decrypted recalled sense information.

4 Claims, 7 Drawing Sheets

LEARN TRAINING DATA SETS (INFORMATION I1 AND I2)

INPUT ONE INFORMATION I1

OUTPUT OTHER INFORMATION I2

SENSORY COMMUNICATION SYSTEM AND SENSORY COMMUNICATION METHOD

CROSS-REFERENCE TO RELATED APPLICATIONS

This application is a Continuation of PCT International Application No. PCT/JP2022/032327 filed on Aug. 29, 2022 which claims the benefit of priority from Japanese Patent Application No. 2021-209849 filed on Dec. 23, 2021, the entire contents of both of which are incorporated herein by reference.

FIELD OF THE INVENTION

The present application relates to a sensory communication system and a sensory communication method.

BACKGROUND OF THE INVENTION

Techniques for a noninvasive measurement of intracerebral activation information, such as the functional magnetic resonance technique and the near-infrared spectroscopy, have developed in recent years and a technology related to a brain machine interface, which is an interface between the brain and the outside, is becoming a reality. An example using such technology, a technique in which brain activation information upon perception by a subject is detected and recalled sense information recalled for the perception by the subject based on the detected brain activation information is formed into a message is disclosed (for example, see Japanese Patent Application Publication No. 2014-115913).

CITATION LIST

According to the technique described in Patent Literature 1, the recalled sense information of the subject corresponds to so-called personal information. In terms of personal information protection, the recalled sense information of the subject is required to be treated properly.

A sensory communication system and a sensory communication method are disclosed.

SUMMARY OF THE INVENTION

According to one aspect of the present application, there is provided a sensory communication system comprising: a first device configured to detect intracerebral activation information of a first subject upon perception by the first subject; an estimation device configured to estimate, based on the detected intracerebral activation information of the first subject, recalled sense information recalled by a second subject different from the first subject for the perception, and perform encryption of the recalled sense information by using the intracerebral activation information of the first subject; and a second device configured to decrypt the encrypted recalled sense information and apply stimulus to the second subject to cause the second subject to recall the decrypted recalled sense information.

According to one aspect of the present application, there is provided a sensory communication method comprising: detecting intracerebral activation information of a first subject upon perception by the first subject; estimating, based on the detected intracerebral activation information of the first subject, recalled sense information recalled by a second subject different from the first subject for the perception, and performing encryption of the recalled sense information by using the intracerebral activation information of the first subject; and decrypting the encrypted recalled sense information and applying stimulus to the second subject to cause the second subject to recall the decrypted recalled sense information.

The above and other objects, features, advantages and technical and industrial significance of this application will be better understood by reading the following detailed description of presently preferred embodiments of the invention, when considered in connection with the accompanying drawings.

DETAILED DESCRIPTION OF THE INVENTION

Embodiments disclosed herein will hereinafter be described based on the drawings. The present invention is not to be limited by these embodiments. Furthermore, components in the following embodiments include those easily substitutable by persons skilled in the art or those that are substantially the same.

First Embodiment

Figure 1:
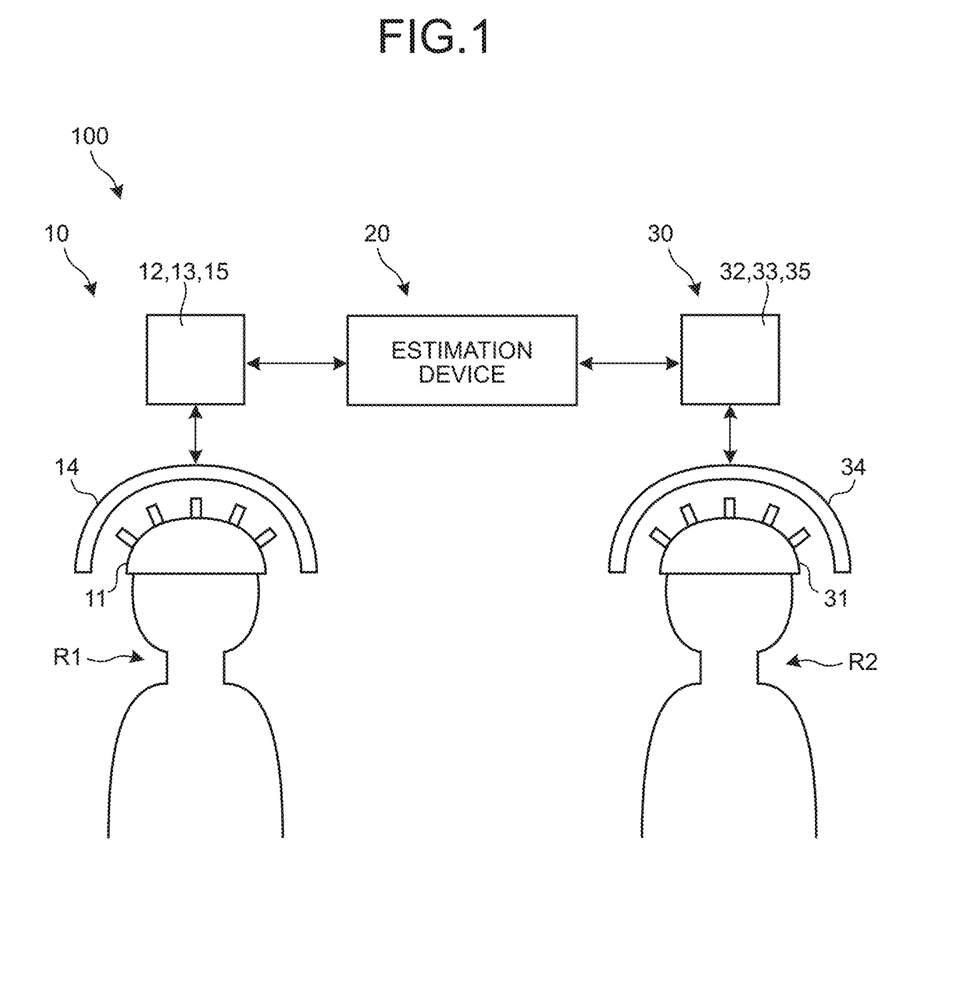
FIG. 1 is a schematic diagram illustrating an example of a sensory communication system according to a first embodiment.
Figure 2:
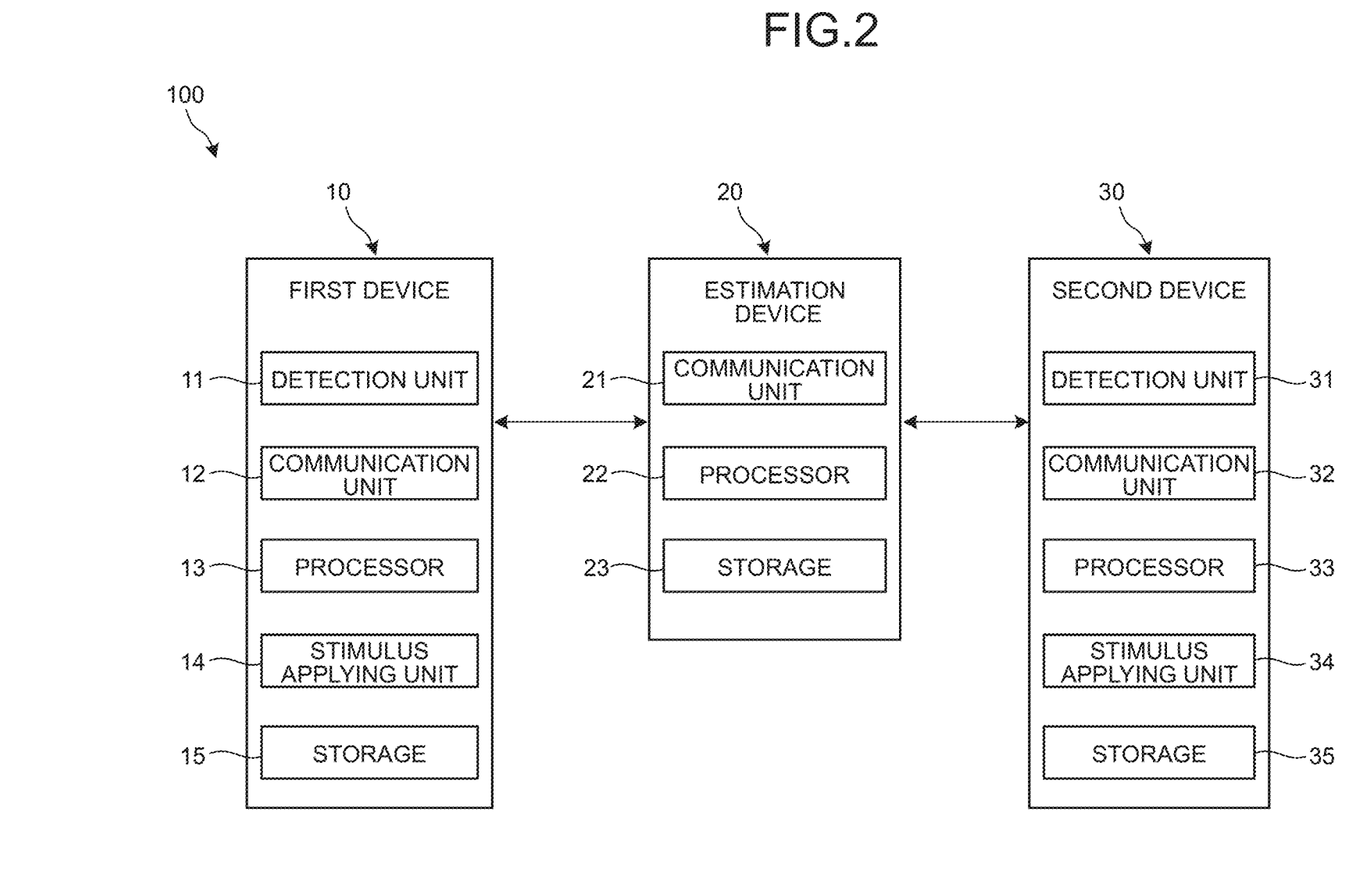
FIG. 2 is a functional block diagram illustrating an example of the sensory communication system according to the first embodiment.

FIG. 1 is a schematic diagram illustrating an example of a sensory communication system 100 according to a first embodiment. FIG. 2 is a functional block diagram illustrating the example of the sensory communication system 100. As illustrated in FIG. 1 and FIG. 2, the sensory communication system 100 includes a first device 10, an estimation device 20, and a second device 30.

The first device 10 detects intracerebral activation information of a first subject R1 upon perception by the first subject R1. The first device 10 includes a detection unit 11, a communication unit 12, a processor 13, a stimulus applying unit 14, and a storage 15.

The detection unit 11 detects intracerebral activation information. Examples of the intracerebral activation information include concentrations of oxyhemoglobin, deoxyhemoglobin, and total hemoglobin that are included in a cerebral blood flow of a subject. Examples of the detection unit 11 that may be used include a measurement device for measurement based on a principle of functional magnetic resonance imaging (fMRI) or functional near-infrared spectroscopy (fNIRS), a measurement device using invasive electrodes, and a measurement device for measurement by means of a micromachine arranged in a cerebral blood vessel. Without being limited to the above mentioned devices, another type of device may be used as the detection unit 11. In a case where the brain of the first subject R1 is divided by a three dimensional matrix formed of voxels, each of which is a few millimeters or smaller, for example, the intracerebral activation information may be expressed as magnitude of activity per voxel. In this embodiment, the detection unit 11 detects intracerebral activation information for estimation of recalled sense information to be transmitted to a second subject R2 separately from intracerebral activation information for encryption of the recalled sense information. When the detection unit 11 detects intracerebral activation information for encryption of recalled sense information, the detection unit 11 may detect intracerebral activation information generated in the primary visual cortex of the first subject R1, for example. As described later, in detecting intracerebral activation information for encryption, the detection unit 11 may detect intracerebral activation information in the primary visual cortex when the first subject R1 looks at an image of a striped pattern that is monotonous and that has a predetermined directivity (hereinafter, referred to as a monotonous striped pattern), for example. The primary visual cortex is in the surface layer of the brain and highly precise intracerebral activation information is thus able to be obtained by the detection unit 11. Furthermore, the above mentioned monotonous striped pattern is easily recognized at the primary visual cortex. Therefore, many subjects recall senses that are substantially the same when they look at the image of the monotonous striped pattern.

The communication unit 12 is an interface for wire communication or wireless communication. The communication unit 12 transmits intracerebral activation information detected by the detection unit 11, to the estimation device 20. The communication unit 12 includes an interface for communication via a so-called wireless LAN with an external device in accordance with the IEEE802.11 standard. The communication unit 12 may implement communication with an external device through control by a processor 22, for example. Without being limited to the wireless LAN, examples of the communication method may include wireless communication methods, such as the Bluetooth (registered trademark) communication method and the wireless USB. Furthermore, wired connection, such as USB cable, HDMI (registered trademark), IEEE1394, or Ethernet may be adopted.

The processor 13, the stimulus applying unit 14, and the storage 15 will be described later. The processor 13, the stimulus applying unit 14, and the storage 15 may be not provided in the first embodiment.

The estimation device 20 has a communication unit 21, a processor 22, and a storage 23. The communication unit 21 is an interface for wire communication or wireless communication. The communication unit 21 receives, for example, intracerebral activation information transmitted from the first device 10. The communication unit 21 transmits, for example, corresponding sense information estimated by the processor 22 and described later to the second device 30. The communication unit 21 may be configured similarly to the communication unit 12 described above.

The processor 22 has a processing device, such as a central processor (CPU), and a storage, such as a random access memory (PAM) or a read only memory (ROM). The processor 22 performs various kinds of processing including estimation processing described hereinafter.

The storage 23 stores various kinds of information. The storage 23 has, for example, a storage, such as a hard disk drive or a solid state drive. An external storage medium, such as a removable disk, may be used as the storage 23.

Based on detected intracerebral activation information of the first subject R1, the processor 22 estimates recalled sense information (reference sense information) on the sense recalled by the first subject R1 for the perception. For example, the recalled sense information may be: information related to at least one of so-called five senses that are eyesight, hearing, touch, taste, and smell; a sense of equilibrium; or any other somatic sense. Specifically, in a case where the recalled sense information is information on eyesight, the recalled sense information is image data perceived by the first subject R1, but without being limited to such image data as is, and the information may be sampled image data sampled from the image data or filtered image data resulting from filtering of the image data. Furthermore, when the recalled sense information is information for eyesight, the information may be information on light that enters eyeballs of the first subject R1. In this case, for example, the information on light may be obtained by a contact lens including an optical sensor. Or the information related to light may be obtained by use of an artificial retina. Specifically, information on light on a CCD sensor provided in the artificial retina may be used. Furthermore, when the recalled sense information is information on hearing, the recalled sense information may be sound signal data perceived by the first subject R1. Furthermore, when the recalled sense information is information on taste, the recalled sense information may be data representing indices of multiple chemical substances reproducing taste perceived by the first subject R1. Furthermore, when the recalled sense information is information on touch, the recalled sense information may be data indicating a portion in a plan development of a whole surface of a body of the first subject R1 to which a stimulus has been applied and a degree of the stimulus. These kinds of the recalled sense information are just examples and the recalled sense information is not limited thereto. A relation between a kind of the intracerebral activation information and a kind of the recalled sense information with respect to the first subject R1, a correspondence relation therebetween may be found by performing experiments in advance. For example, a first trained model may be generated by machine learning with paired training data sets each having the intracerebral activation information detected from the first subject R1 and the recalled sense information corresponding to the intracerebral activation information in association with each other. The first trained model may be stored in, for example, the storage 23 in advance.

Furthermore, based on reference sense information that has been estimated, the processor 22 estimates corresponding sense information that is recalled sense information for the second subject R2 different from the first subject R1 and corresponding to the reference sense information. Specific examples of the corresponding sense information may correspond to specific examples of the recalled sense information. The second subject R2 is a subject that is a communication destination where a sense of the first subject R1 is communicated to. A relation between the reference sense information and the corresponding sense information may be made by performing experiments in advance. For example, a second trained model may be generated by machine learning with paired training data sets each having pieces of the reference sense information and the corresponding sense information of the second subject R2. The second trained model may be stored in, for example, the storage 23 in advance.

Furthermore, the processor 22 encrypts the corresponding sense information that has been estimated, by using intracerebral activation information of the first subject R1. When the processor 22 performs encryption, the processor 22 may use the intracerebral activation information detected from the primary visual cortex of the first subject R1. More specifically, the processor 22 may use the intracerebral activation information detected from the primary visual cortex of the first subject R1 when the first subject R1 looks at the above mentioned image of the monotonous striped pattern, for example. As described above, the primary visual cortex is in the surface layer of the brain and highly precise intracerebral activation information is thus able to be obtained by the first device 10. Furthermore, the above mentioned monotonous striped pattern is easily recognized at the primary visual cortex. Therefore, many subjects recall senses that are substantially the same when they look at the image of the monotonous striped pattern. Therefore, reproducibility of the encryption is able to be increased.

The processor 22 may perform encryption with an encryption key generated using the intracerebral activation information, for example. The processor 22 may generate the encryption key by a publicly known encryption key generation method, such as public key cryptography, symmetric key cryptography, or key exchange. Examples of a mode of generating an encryption key by using the intracerebral activation information include a mode where the processor 22 quantizes the intracerebral activation information detected from the primary visual cortex of the first subject R1 when the first subject R1 looks at the image of the monotonous striped pattern to an extent where reproducibility is ensured, and causes the quantized intracerebral activation information to influence factor information for encryption key generation. In this case, the detection unit 11 of the first device 10 detects the intracerebral activation information upon looking at the image of the monotonous striped pattern, separately from the intracerebral activation information for estimating the recalled sense information to be transmitted to the second subject R2. The processor 22 may encrypt, in addition to the corresponding sense information, the reference sense information that has been estimated, by a similar procedure.

The second device 30 applies stimulus to the second subject R2 to cause the second subject R2 to recall the corresponding sense information that has been estimated. The second device 30 has a detection unit 31, a communication unit 32, a processor 33, a stimulus applying unit 34, and a storage 35.

The detection unit 31 will be described later. In this first embodiment, the detection unit 31 may be not provided.

The communication unit 32 is an interface for wire communication or wireless communication. The communication unit 32 receives the corresponding sense information transmitted from the estimation device 20. Furthermore, the communication unit 32 transmits the intracerebral activation information detected by the detection unit 31, to the estimation device 20. The communication unit 32 may be configured similarly to the communication unit 12 described above.

The processor 33 decrypts the corresponding sense information received by the communication unit 32. The processor 33 may decrypt the corresponding sense information by using a decryption key corresponding to an encryption key by the processor 22 of the estimation device 20, for example. The decryption key is generated according to the above mentioned encryption key generation method. The processor 33 may obtain the decryption key and store the decryption key in the storage 35 in advance, or the encryption key and the decryption key may be transmitted together from the estimation device 20 to the second device 30. Based on the corresponding sense information that has been decrypted and a third trained model described hereinafter, the processor 33 may estimate stimulus image information corresponding to the corresponding sense information received.

The third trained model is a trained model obtaining from machine learning with paired training data sets each having stimulus image information described later for the second subject R2 and corresponding sense information which corresponds to recalled sense information recalled by the second subject R2 when irradiation with electromagnetic waves is performed based on the stimulus image information. The third trained model may be stored in the storage 35 of the second device 30 in advance, for example.

The stimulus applying unit 34 applies stimulus to the second subject R2 by irradiating a target region of the brain of the second subject R2 with an electromagnetic wave signal and activating the target region. In this case, the brain of the second subject R2 is divided by a three dimensional matrix formed of voxels, each of which is a few millimeters or smaller, for example, and irradiation with electromagnetic waves is performed per voxel. The stimulus applying unit 34 may perform the irradiation with electromagnetic waves based on stimulus image information indicating the voxel of the three dimensional matrix to be irradiated with electromagnetic waves and a degree of intensity thereof. Sizes and positions of voxels in a three dimensional matrix of the stimulus image information may correspond to those of voxels in a three dimensional matrix of the intracerebral activation information, for example. A relation among the position of the voxel, the intensity of the electromagnetic waves, and a kind of recalled sense information upon irradiating the voxel with electromagnetic waves may be found by performing experiments in advance.

Figure 3:
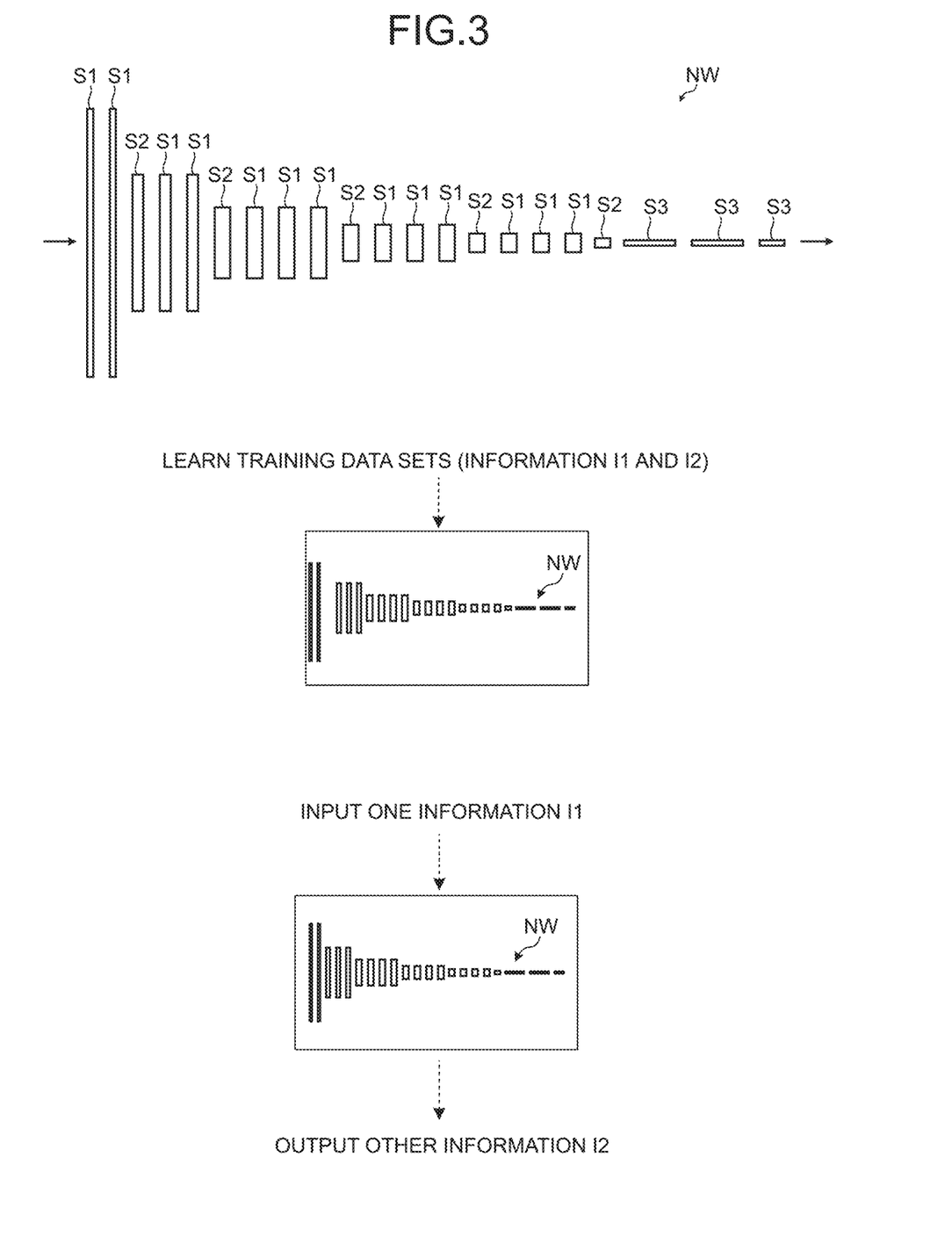
FIG. 3 is a diagram illustrating an example of a neural network.

The above described first trained model, second trained model, and third trained model may be generated by using a neural network (a convolutional neural network) represented by VGG16, for example. FIG. 3 is a diagram illustrating an example of the neural network. As illustrated at the top of FIG. 3, a neural network NW has 13 convolutional layers S1, five pooling layers S2, and three fully connected layers S3. In the neural network, processing of input information is performed in order in the convolutional layers S1 and the pooling layers S2, and results of the processing are connected in the fully connected layers S3 and output.

In the generation of the first trained model, the second trained model, and the third trained model, as illustrated in the middle of FIG. 3, training data sets each including corresponding pieces of information (I1 and I2) are input to the neural network NW and a correlation in the training data sets is learnt by machine learning, such as deep learning. That is, the neural network NW is optimized by training and a trained model is thereby generated. For example, training is done so that when one of pieces of information composing each training data set is input, a problem of finding the other one of the pieces of information is solved.

When estimation is made by use of the first trained model, the second trained model, and the third trained model, as illustrated at the bottom of FIG. 3, one piece of information (I1) of the two pieces of information composing each training data set is input to the neural network NW. Based on a result of learning the correlation between the pieces of information composing the training data sets, the other piece of information I2 corresponding to the input of one piece of information I1 is output from the first trained model, the second trained model, and the third trained model respectively. An example in which a trained model is generated by use of a convolutional network represented by VGG16 is described with respect to this embodiment, but without being limited to this example, a trained model may be generated by use of another type of the neural network.

Figure 4:
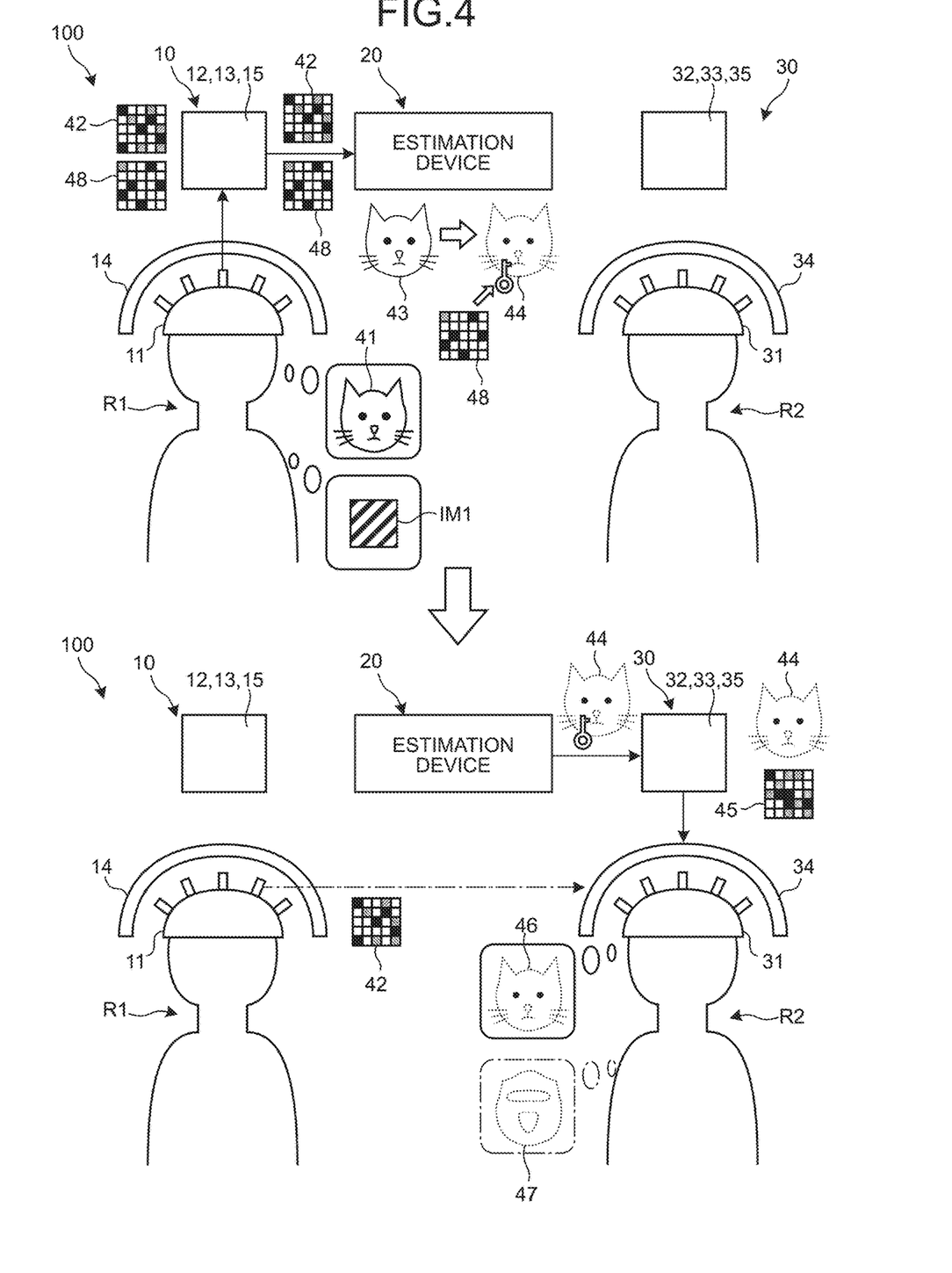
FIG. 4 is a diagram schematically illustrating an example of operation of the sensory communication system according to the first embodiment.

A sensory communication method using the sensory communication system 100 configured as described above will be described next. FIG. 4 is a diagram schematically illustrating an example of operation of the sensory communication system 100. As illustrated in FIG. 4, perception by the first subject R1 is caused so that the first subject R1 recalls reference sense information. When the first subject R1 visually perceives a face of a cat and recalls eyesight information will hereinafter be described as an example. Furthermore, the first subject R1 is caused to perceive an image IM1 of a monotonous striped pattern for encryption, by eyesight.

As illustrated at the top of FIG. 4, the detection unit 11 detects intracerebral activation information 42 of the first subject R1 perceiving the face of the cat and recalling recalled sense information 41. Furthermore, the detection unit 11 detects intracerebral activation information 48 of the first subject R1 which is recalled from the image IM1 of the monotonous striped pattern. The communication unit 12 transmits the intracerebral activation information 42 and 48 detected by the detection unit 11 to the estimation device 20.

At the estimation device 20, the communication unit 21 receives the intracerebral activation information 42 and 48 transmitted from the first device 10. The processor 22 estimates reference sense information 43 based on the intracerebral activation information 42 received. In this case, the processor 22 inputs the intracerebral activation information 42 of the first subject R1 into the first trained model. Based on a result of learning a correlation between the intracerebral activation information 42 and the reference sense information 43, the reference sense information 43 corresponding to the intracerebral activation information 42 input is output from the first trained model. The processor 22 obtains the reference sense information 43 output as an estimation result.

Based on the reference sense information 43 estimated, the processor 22 estimates corresponding sense information 44 for the second subject R2 corresponding to the reference sense information 43. In this case, the processor 22 inputs the obtained reference sense information 43 into the second trained model. Based on a result of learning a correlation between the reference sense information 43 and the corresponding sense information 44, the corresponding sense information 44 corresponding to the input reference sense information 43 is output from the second trained model. The processor 22 obtains the corresponding sense information 44 output as an estimation result. Furthermore, the processor 22 encrypts the corresponding sense information 44 by using the intracerebral activation information 48 received separately from the intracerebral activation information 42. The communication unit 21 transmits the corresponding sense information 44 that has been encrypted, to the second device 30.

At the second device 30, the communication unit 32 receives the corresponding sense information 44 transmitted from the estimation device 20. The processor 33 decrypts the corresponding sense information 44 received and inputs the decrypted corresponding sense information 44 into the third trained model stored in the storage unit 35. Based on a result of learning a correlation between the corresponding sense information 44 and the stimulus image information, stimulus image information 45 corresponding to the input corresponding sense information 44 is output from the third trained model. Based on the output stimulus image information 45, the stimulus applying unit 34 applies stimulus to the second subject R2 by irradiating the brain of the second subject R2 with electromagnetic waves. As a result, the second subject R2 to which the stimulus has been applied by the stimulus applying unit 34 recalls corresponding sense information 46 corresponding to the stimulus image information 45. That is, the second subject R2 recalls the corresponding sense information 46 that is eyesight information on a face of a cat.

In general, there are, for example, characteristic differences between the first subject R1 and the second subject R2 and their correspondence relations between active states of their brains and their intracerebral activation information are thus different from each other. Therefore, as illustrated at the bottom of FIG. 4 (represented by a dash-dotted line), when the intracerebral activation information 42 of the first subject R1 is directly transmitted to the second device 30 and stimulus is applied to the brain of the second subject R2 at the second device 30 in a manner corresponding to the intracerebral activation information 42, eyesight information different from the face of the cat is highly likely to be recalled as recalled sense information 47 by the second subject R2. In this case, recalled sense information of the first subject R1 is not appropriately communicated to the second subject R2.

By contrast, in the sensory communication system 100 according to the embodiment, the corresponding sense information 44 of the second subject R2 is estimated by the estimation device 20 and eyesight information on the face of the cat is thus communicated from the first subject R1 to the second subject R2.

Figure 5:
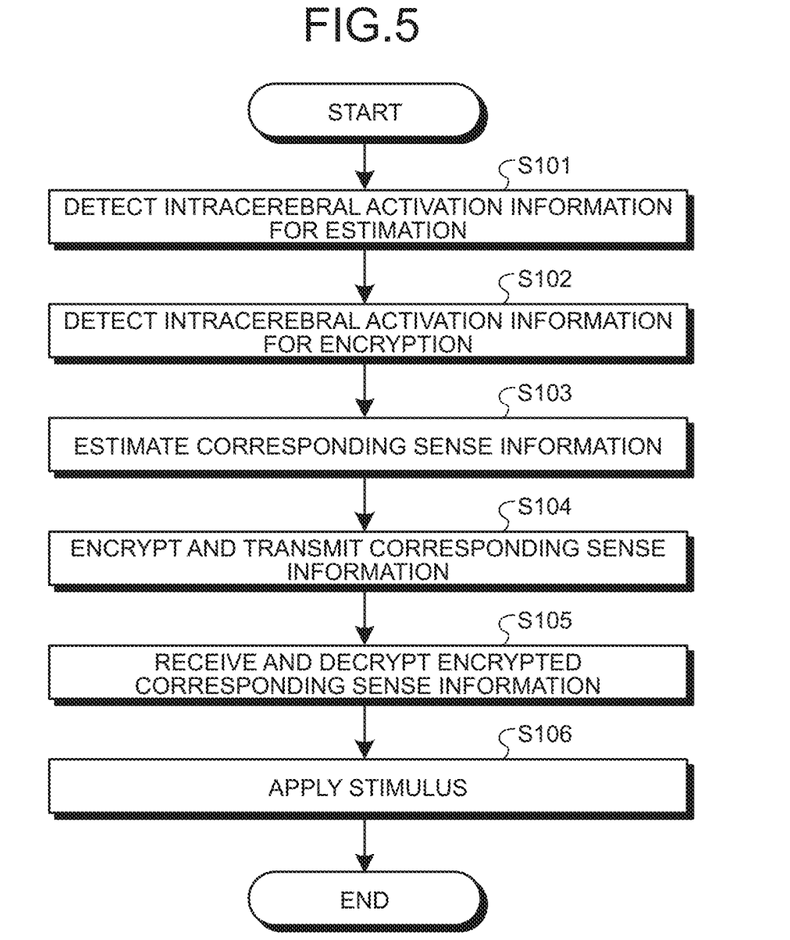
FIG. 5 is a flowchart illustrating an example of operation of the sensory communication system according to the first embodiment.

FIG. 5 is a flowchart illustrating an example of operation of the sensory communication system 100. As illustrated in FIG. 5, in the sensory communication system 100, the first device 10 detects intracerebral activation information of the first subject R1 upon perception by the first subject R1, that is, intracerebral activation information for estimating recalled sense information (hereinafter, called the intracerebral activation information for estimation) (Step S101). Furthermore, the first device 10 separately detects intracerebral activation information of the first subject R1 for performing encryption (hereinafter, called the intracerebral activation information for encryption) (Step S102). Subsequently, the estimation device 20 estimates, based on the intracerebral activation information for estimation of the first subject R1, reference sense information recalled by the first subject R1 in response to perception, and estimates, based on the estimated reference sense information, corresponding sense information corresponding to the reference sense information, for the second subject R2 different from the first subject R1 (Step S103). Furthermore, by using the intracerebral activation information for encryption, the estimation device 20 encrypts the estimated corresponding sense information and transmits the encrypted corresponding sense information to the second device 30 (Step S104). The second device 30 receives and decrypts the encrypted corresponding sense information (Step S105) and applies stimulus to the second subject R2 so that the second subject R recalls the decrypted corresponding sense information (Step S106).

As described above, the sensory communication system 100 according to the embodiment includes: the first device 10 that detects the intracerebral activation information of the first subject R1 upon perception by the first subject R1; the estimation device 20 that estimates, based on the detected intracerebral activation information of the first subject R1, recalled sense information recalled by the second subject R2 different from the first subject R1 in response to perception, and encrypts the recalled sense information by using the intracerebral activation information of the first subject R1; and the second device 30 that decrypts the encrypted recalled sense information and applies stimulus to the second subject R2 so that the second subject R2 recalls the decrypted recalled sense information.

The sensory communication method according to the embodiment includes: detecting intracerebral activation information of the first subject R1 upon perception by the first subject R1; estimating, based on the detected intracerebral activation information of the first subject R1, recalled sense information recalled by the second subject R2 different from the first subject R1 in response to perception, and encrypting the recalled sense information by using the intracerebral activation information of the first subject R1; and decrypting the encrypted recalled sense information and applying stimulus to the second subject R2 so that the second subject R2 recalls the decrypted recalled sense information.

This configuration enables appropriate communication of recalled sense information from the first subject R1 to the second subject R2 even in a case where there is a difference between activities of the brains of the first subject R1 and the second subject R2. Furthermore, in the communication of the recalled sense information, the recalled sense information is encrypted by use of the intracerebral activation information of the first subject R1 and thus the recalled sense information that is personal information on the subject is able to be protected properly.

In the sensory communication system 100 according to the embodiment, the estimation device 20 uses the intracerebral activation information detected from the primary visual cortex of the first subject R1 when the encryption is performed. The primary visual cortex exists in a surface layer of the brain. Therefore, highly precise intracerebral activation information is able to be obtained by this configuration.

In the sensory communication system 100 according to the embodiment, when the encryption is performed, the estimation device 20 uses the intracerebral activation information detected from the primary visual cortex of the first subject R1 upon the first subject R1 looking at the image of the monotonous striped pattern. The monotonous striped pattern as mentioned above is easily recognized at the primary visual cortex. Therefore, many subjects recall senses that are substantially the same when they look at the image of the monotonous striped pattern. Therefore, high reproducibility is able to be achieved.

In the sensory communication system 100 according to the embodiment, the estimation device 20 performs the encryption with the encryption key generated using the intracerebral activation information. This configuration enables security to be increased by the encryption with the encryption key generated by use of the intracerebral activation information.

Second Embodiment

A second embodiment will be described next. A case where the sensory communication system 100 communicates a sense from the first subject R1 to the second subject R2 unidirectionally has been described as an example with respect to the first embodiment. By contrast, in this second embodiment, a sensory communication system 100 communicates a sense also from a second subject R2 to a first subject R1. That is, the sensory communication system 100 is configured to enable bidirectional communication of senses between the first subject R1 and the second subject R2.

An overall configuration of the sensory communication system 100 is similar to that of the first embodiment. A configuration of the sensory communication system 100 will be described in relation to a second device 30 by reference to FIG. 1 and FIG. 2.

The second device 30 has a detection unit 31, a communication unit 32, a processor 33, a stimulus applying unit 34, and a storage 35. The processor 33, the stimulus applying unit 34, and the storage 35 are similar to those of the first embodiment. The detection unit 31 detects intracerebral activation information of the second subject R2, similarly to the detection unit 11 according to the first embodiment. In this embodiment, the detection unit 31 detects intracerebral activation information for estimation of recalled sense information to be transmitted to the first subject R1 and intracerebral activation information for encryption of recalled sense information, separately from each other. When the detection unit 31 detects the intracerebral activation information for encryption of the recalled sense information, the detection unit 31 may detect intracerebral activation information generated in the primary visual cortex upon the second subject R2 looking at an image of a monotonous striped pattern, for example. The communication unit 32 transmits the intracerebral activation information detected by the detection unit 31, to an estimation device 20.

Similarly to the first embodiment, the estimation device 20 has a communication unit 21, a processor 22, and a storage 23. The communication unit 21 is capable of wire communication or wireless communication. In this embodiment, the communication unit 21 receives, for example, the intracerebral activation information transmitted from the second device 30. The communication unit 21 transmits, for example, corresponding sense information estimated by the processor 22 and described later, to a first device 10.

Based on the detected intracerebral activation information of the second subject R2, the processor 22 estimates recalled sense information (reference sense information) for a sense recalled by the second subject R2 in response to perception. A relation between a kind of the intracerebral activation information and a kind of the recalled sense information recalled for the second subject R2 may be found by performing experiments in advance. For example, a fourth trained model may be generated by machine learning with paired training data sets each having the intracerebral activation information detected from the second subject R2 and the recalled sense information corresponding to the intracerebral activation information in association with each other. The fourth trained model may be stored in the storage 23 in advance, for example.

Furthermore, based on the estimated reference sense information, the processor 22 estimates, for the first subject R1, corresponding sense information that is recalled sense information corresponding to the reference sense information. In this case, the processor 22 may perform estimation based on the second trained model stored in the storage 23.

Furthermore, the processor 22 performs encryption of the estimated corresponding sense information by using the intracerebral activation information of the second subject R2. When the processor 22 performs encryption, the processor 22 may use the intracerebral activation information detected from the primary visual cortex of the second subject R2. More specifically, similarly to the first embodiment, the processor 22 may use the intracerebral activation information detected from the primary visual cortex of the second subject R2 upon the second subject R2 looking at an image of a monotonous pattern. Furthermore, similarly to the first embodiment, the processor 22 may perform encryption with an encryption key generated by use of the intracerebral activation information, for example.

The first device 10 has a detection unit 11, a communication unit 12, a processor 13, a stimulus applying unit 14, and a storage 15. The detection unit 11 and the communication unit 12 are configured similarly to those according to the first embodiment. The communication unit 12 receives the corresponding sense information transmitted from the estimation device 20.

The processor 13 decrypts the corresponding sense information received by the communication unit 12. The processor 13 may decrypt the corresponding sense information by using a decryption key corresponding to the encryption key used by the processor 22 of the estimation device 20, for example. The processor 13 estimates stimulus image information corresponding to the decrypted corresponding sense information. The stimulus image information is information indicating stimulus to be applied to the first subject R1 by the stimulus applying unit 14.

The stimulus applying unit 14 applies stimulus to the first subject R1 by irradiating a target region of the brain of the first subject R1 with an electromagnetic wave signal and activating the target region. In this case, similarly to the stimulus applying unit 34 according to the first embodiment, the brain of the first subject R1 is divided by a three dimensional matrix formed of voxels, each of which is a few millimeters or smaller, for example, and irradiation with electromagnetic waves is performed per voxel. The stimulus applying unit 14 may perform the irradiation with electromagnetic waves based on stimulus image information indicating the voxel of the three dimensional matrix to be irradiated with electromagnetic waves and a degree of intensity thereof. A relation among a position of the voxel, an intensity of the electromagnetic waves, and a kind of the recalled sense information upon irradiating the voxel with electromagnetic waves may be found by performing experiments in advance.

For example, a fifth trained model may be generated by machine learning with paired training data sets each having stimulus image information of the first subject R1 and the recalled sense information recalled by the first subject R1 upon irradiation with electromagnetic waves based on the stimulus image information in association with each other. The fifth trained model may be stored in the storage 15 of the first device 10 in advance, for example.

The above described fourth trained model and fifth trained model may be generated by using a neural network represented by VGG16, for example, similarly to the first trained model to the third trained model. In the generation of the fourth trained model and fifth trained model, each training data set is input to a neural network and a correlation for training data sets is learnt by machine learning, such as deep learning. That is, the neural network is optimized by training and a trained model is thereby generated. Without being limited to a convolutional neural network represented by VGG16, a trained model may be generated by use of another type of the neural network.

A sensory communication method using the sensory communication system 100 configured as described above will be described next. A sensory communication method for communication of a sense from the first subject R1 to the second subject R2 is similar to that according to the first embodiment. In a case described with respect to this embodiment, a sense is communicated from the second subject R2 to the first subject R1.

Figure 6:
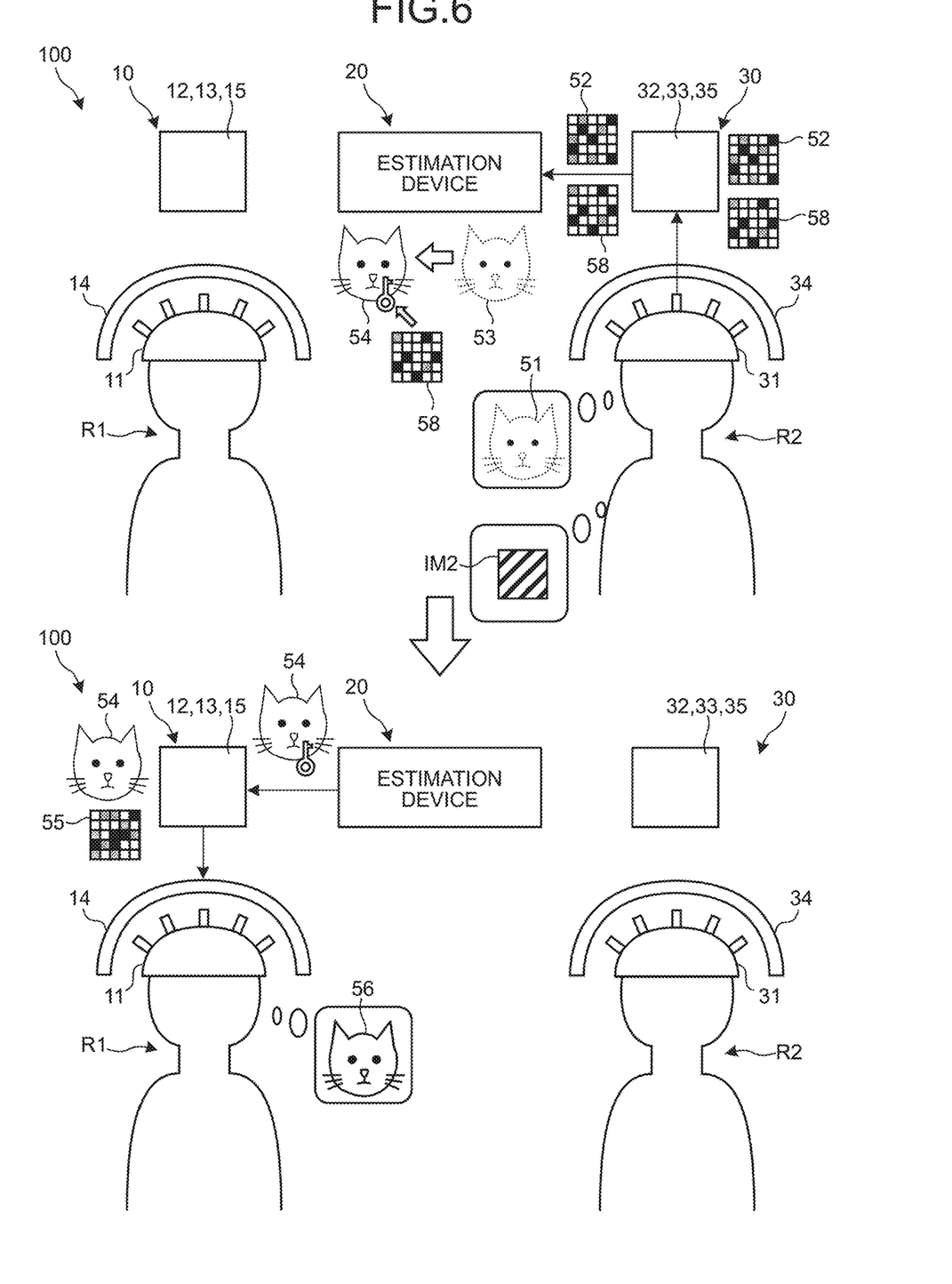
FIG. 6 is a diagram schematically illustrating another example of the operation of the sensory communication system according to a second embodiment.

FIG. 6 is a diagram schematically illustrating an example of operation of the sensory communication system 100. As illustrated in FIG. 6, the second subject R2 is caused to perceive to recall the reference sense information. A case where the second subject R2 visually perceives a face of a cat and recalls eyesight information will hereinafter be described as an example. In the following example, a face of a cat is the face of a cat similarly to the first embodiment. Furthermore, the second subject R2 is caused to perceive an image IM2 with a monotonous striped pattern for encryption, by eyesight.

As illustrated at the top of FIG. 6, the detection unit 31 detects intracerebral activation information 52 of the second subject R2 perceiving the face of a cat and recalling recalled sense information 51. Furthermore, the detection unit 31 detects intracerebral activation information 58 of the second subject R2 recalled by the image IM2 of the monotonous striped pattern. The communication unit 32 transmits the intracerebral activation information 52 and 58 detected by the detection unit 31 to the estimation device 20.

At the estimation device 20, the communication unit 21 receives the intracerebral activation information 52 transmitted from the second device 30. The processor 22 estimates reference sense information 53 based on the received intracerebral activation information 52. In this case, the processor 22 inputs the intracerebral activation information 52 of the second subject R2 into the fourth trained model. Based on a result of learning a correlation between the intracerebral activation information 52 and the reference sense information 53, the reference sense information 53 corresponding to the input intracerebral activation information 52 is output from the fourth trained model. The processor 22 obtains the reference sense information 53 output as an estimation result.

Based on the estimated reference sense information 53, the processor 22 estimates corresponding sense information 54 corresponding to the reference sense information 53, for the first subject R1. In this case, the processor 22 inputs the obtained reference sense information 53 into the second trained model. Based on a result of learning a correlation between the reference sense information 53 and the corresponding sense information 54, corresponding sense information 54 corresponding to the input reference sense information 53 is output from the second trained model. The processor 22 obtains the corresponding sense information 54 output as an estimation result. Furthermore, the processor 22 encrypts the corresponding sense information 54 by using the intracerebral activation information 58 received separately from the intracerebral activation information 52. The communication unit 21 transmits the encrypted corresponding sense information 54 to the first device 10.

As illustrated at the bottom of FIG. 6, at the first device 10, the communication unit 12 receives the corresponding sense information 54 transmitted from the estimation device 20. The processor 13 decrypts the received corresponding sense information 54, and inputs the decrypted corresponding sense information 54 into the fifth trained model stored in the storage 15. Based on a result of learning a correlation between the corresponding sense information 54 and the stimulus image information 55, the stimulus image information 55 corresponding to the input corresponding sense information 54 is output from the fifth trained model. The stimulus applying unit 14 applies stimulus to the first subject R1 by irradiating the brain of the first subject R1 with electromagnetic waves based on the output stimulus image information 55. As a result, the first subject R1 to which the stimulus has been applied by the stimulus applying unit 14 recalls corresponding sense information 56 corresponding to the stimulus image information 55. That is, the first subject R1 recalls the corresponding sense information 56 that is eyesight information on the face of a cat. The eyesight information on the face of a cat is thus communicated from the second subject R2 to the first subject R1.

As described above, in the sensory communication system 100 according to this embodiment, the reference sense information is the recalled sense information recalled by the second subject R2 whose intracerebral activation information has been detected. This configuration enables appropriate communication of the recalled sense information between subjects having brain activities different from each other by direct association between the recalled sense information of the second subject R2 and the recalled sense information of the first subject R1. Furthermore, upon communication of the recalled sense information, the recalled sense information is encrypted by use of the intracerebral activation information of the second subject R2 and the recalled sense information that is personal information on the subject is thus able to be protected properly.

Third Embodiment

A third embodiment will be described next. With respect to the above described first and second embodiments, the recalled sense information recalled by the subject, whose intracerebral activation information has been detected, has been described as the reference sense information. By contrast, with respect to the third embodiment, a case where reference sense information is standard sense information extracted based on the recalled sense information for multiple subjects will be described as an example. An overall configuration of a sensory communication system 100 is similar to that of the first embodiment.

At an estimation device 20, when the corresponding sense information is estimated from the reference sense information, standard sense information is used as the reference sense information. The standard sense information may be a mean value of the intracerebral activation information detected in multiple subjects when they perceive the same thing, for example, they look at the same image. Therefore, the standard sense information is recalled sense information of an average person, with differences among individuals due to acquired memory, for example, being small.

The standard sense information is able to be extracted from a result of learning the recalled sense information among the multiple subjects. For example, a sixth trained model may be generated by machine learning with paired training data sets each having the intracerebral activation information of a specific subject (for example, a first subject R1 or a second subject R2) and the standard sense information (a mean value of the intracerebral activation information of the multiple subjects). In the generation of the sixth trained model, standard sense information may be extracted from multiple pieces of the recalled sense information included in the training data sets and the extracted standard sense information and each piece of the individual intracerebral activation information included in the training data sets may be associated with each other. As a result, the sixth trained model, in which a correspondence relation between the individual intracerebral activation information of multiple subjects and the standard sense information is machine-learned for different types of the recalled sense information, such as, for example, the recalled sense information on eyesight upon looking at an object, the recalled sense information upon hearing a sound, and the recalled sense information upon touching an object, is generated. The sixth trained model may be stored in, for example, a storage 35.

Figure 7:
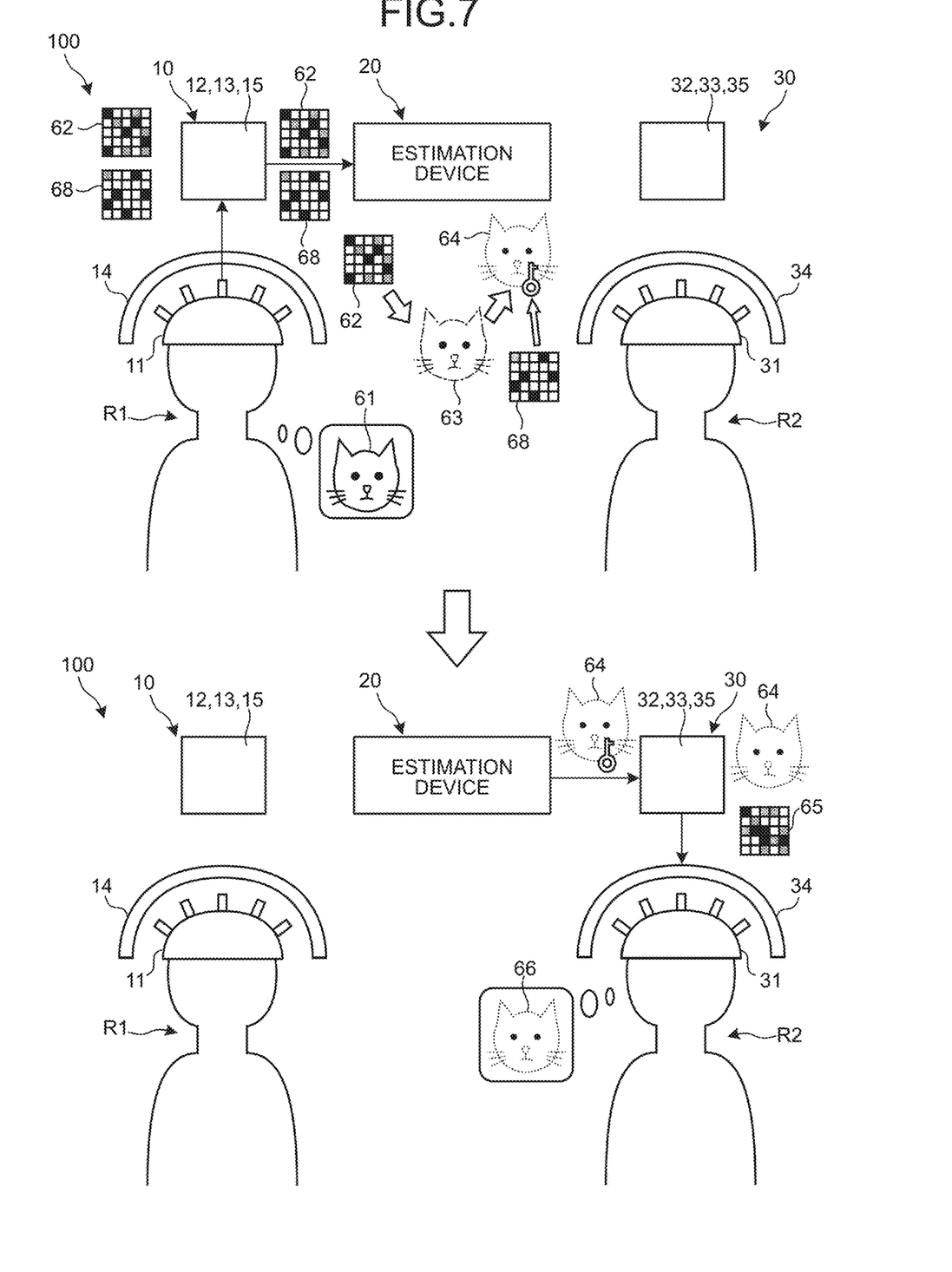
FIG. 7 is a diagram schematically illustrating another example of the operation of the sensory communication system according to a third embodiment.

A sensory communication method using the sensory communication system 100 configured as described above will be described next. FIG. 7 is a diagram schematically illustrating an example of operation of the sensory communication system 100. For example, in a case where the recalled sense information 61 upon perception by the first subject R1 is to be communicated to the second subject R2, intracerebral activation information 62 of the first subject R1 is obtained at a first device 10 and transmitted to the estimation device 20. Furthermore, at the first device 10, intracerebral activation information 68 of the first subject R1 recalled from an image IM3 of a monotonous striped pattern is detected.

At the estimation device 20, a processor 22 inputs the intracerebral activation information 62 transmitted from the first device 10 and identification information on the second subject R2 as a communication destination of the recalled sense information into the sixth trained model stored in the storage 35. In the sixth trained model, standard sense information 63 corresponding to the intracerebral activation information 62 is estimated, and the recalled sense information of the second subject R2 associated with the standard sense information 63 is output as corresponding sense information 64. By using the intracerebral activation information 68 received separately from the intracerebral activation information 62, the processor 22 encrypts the output corresponding sense information 64. The communication unit 21 transmits the encrypted corresponding sense information 64 to a second device 30.

At the second device 30, similarly to the first embodiment, the corresponding sense information 64 transmitted from the estimation device 20 is decrypted and stimulus image information 65 is obtained based on the decrypted corresponding sense information 64. By irradiating the brain of the second subject R2 with electromagnetic waves based on the output stimulus image information 65, the stimulus applying unit 34 applies stimulus to the second subject R2. The second subject R2 to which the stimulus has been applied by the stimulus applying unit 34 recalls corresponding sense information 66 corresponding to the stimulus image information 65.

As described above, in the sensory communication system 100 according to this embodiment, the reference sense information is the standard sense information 63 extracted based on pieces of the recalled sense information for the multiple subjects. This configuration enables appropriate communication of the recalled sense information among many subjects since the standard sense information 63 extracted based on pieces of the recalled sense information for the multiple subjects is used as the reference sense information. Furthermore, upon communication of the recalled sense information, the recalled sense information is encrypted by use of the intracerebral activation information of the first subject R1 and thus the recalled sense information that is personal information on the subject is able to be protected properly.

The technical scope of the present application is not limited to the embodiments described above and modifications may be made as appropriate without departing from the gist of the present application. For example, the recalled sense information on eyesight has been described as an example with respect to each of the above described embodiments, but without being limited to this example, any other recalled sense information enabling intracerebral activation information to be detected may be adopted. Furthermore, detailed recalled sense information obtained by using recalled sense information on five senses together may be adopted.

Furthermore, the sensory communication systems 100 according to the above described embodiments may be used when the recalled sense information of the first subject R1 at a first time point is caused to be recalled by the first subject R1 at a second time point temporally later than the first time point. The first device 10 obtains the reference sense information of the first subject R1 at the first time point and transmits the reference sense information to the estimation device 20. The estimation device 20 stores the reference sense information into the storage unit 23. Thereafter, the estimation device 20 performs estimation of corresponding sense information corresponding to the first subject R1 for the second time point based on the reference sense information of the first subject R1 for the first time point and transmits a result of the estimation to the first device 10. At the first device 10, the stimulus applying unit 14 applies stimulus to the first subject R1 to cause the first subject R1 to recall the estimated corresponding sense information. A sense of the first subject R1 at the first time point is thereby able to be relieved at the second time point. In this case, the sensory communication system 100 transmits the recalled sense information between the first subject R1 in the past (at the first time point) and the first subject R1 at the time of applying the stimulus (at the second time point), that is, from a person to the same person. Encryption is assumed to be performed in the above described embodiments, but when there is no risk of unauthorized use, such as wiretapping, the estimation device 20 may transmit the recalled sense information to the first device 10 without encrypting the recalled sense information. Rationalization is thereby achieved in terms of processing time and power consumption that are needed for encryption and decryption.

A sensory communication system and a sensory communication method according to the present application can be used for, for example, a processing apparatus, such as a computer.

The present application can provide a sensory communication system and a sensory communication method that enable proper protection of personal information on a subject.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sensory communication system comprising:
   a first device configured to detect intracerebral activation information of a first subject upon perception by the first subject;
   an estimation device configured to estimate, based on the detected intracerebral activation information of the first subject, recalled sense information recalled by a second subject different from the first subject for the perception, and perform encryption of the recalled sense information by using the intracerebral activation information of the first subject; and
   a second device configured to decrypt the encrypted recalled sense information and apply stimulus to the second subject to cause the second subject to recall the decrypted recalled sense information,
   wherein on performing the encryption, the estimation device is further configured to use the intracerebral activation information detected from a primary visual cortex of the first subject when the first subject looks at an image of a monotonous striped pattern having a predetermined directivity.

2. The sensory communication system according to claim 1, wherein on performing the encryption, the estimation device is further configured to use the intracerebral activation information detected from the primary visual cortex of the first subject.

3. The sensory communication system according to claim 1, wherein the estimation device is further configured to perform the encryption with an encryption key generated by use of the intracerebral activation information.

4. A sensory communication method comprising:
   detecting intracerebral activation information of a first subject upon perception by the first subject;
   estimating, based on the detected intracerebral activation information of the first subject, recalled sense information recalled by a second subject different from the first subject for the perception, and performing encryption of the recalled sense information by using the intracerebral activation information of the first subject; and
   decrypting the encrypted recalled sense information and applying stimulus to the second subject to cause the second subject to recall the decrypted recalled sense information,
   wherein on performing the encryption, using the intracerebral activation information detected from a primary visual cortex of the first subject when the first subject looks at an image of a monotonous striped pattern having a predetermined directivity.

* * * * *